US010365403B2

(12) United States Patent
Aldea et al.

(10) Patent No.: US 10,365,403 B2
(45) Date of Patent: Jul. 30, 2019

(54) AUTOMATED CALIBRATION OF A STRATIGRAPHIC FORWARD MODELLING (SFM) TOOL USING A NEIGHBORHOOD ALGORITHM WITH EXPLICIT ESCAPE CLAUSES

(71) Applicant: SHELL OIL COMPANY, Houston, TX (US)

(72) Inventors: Oriol Falivene Aldea, Rijswijk (NL); Stéphane Youri Richard Michael Joachim Gesbert, Rijswijk (NL); James Cecil Pickens, Rijswijk (NL)

(73) Assignee: SHELL OIL COMPANY, Houston, TX (US)

( * ) Notice: Subject to any disclaimer, the term of this patent is extended or adjusted under 35 U.S.C. 154(b) by 1339 days.

(21) Appl. No.: 14/366,329

(22) PCT Filed: Dec. 19, 2012

(86) PCT No.: PCT/EP2012/076087
§ 371 (c)(1),
(2) Date: Jun. 18, 2014

(87) PCT Pub. No.: WO2013/092663
PCT Pub. Date: Jun. 27, 2013

(65) Prior Publication Data
US 2015/0127261 A1 May 7, 2015

(30) Foreign Application Priority Data
Dec. 20, 2011 (EP) .................................... 11194667

(51) Int. Cl.
G01V 99/00 (2009.01)
G01V 1/30 (2006.01)

(52) U.S. Cl.
CPC .............. *G01V 99/00* (2013.01); *G01V 1/302* (2013.01); *G01V 99/005* (2013.01)

(58) Field of Classification Search
None
See application file for complete search history.

(56) References Cited

U.S. PATENT DOCUMENTS 4,953,142 A * 8/1990 Rimmer ................. G01V 1/282
367/53
5,704,713 A * 1/1998 Kim ......................... G01K 3/04
374/102

(Continued)

OTHER PUBLICATIONS

PCT International Search Report, Application No. PCT/EP2012/076087 dated Aug. 29, 2013.

(Continued)

Primary Examiner — Gregory J Toatley, Jr.
Assistant Examiner — Brandon J Becker

(57) ABSTRACT

A modified direct search Neighborhood Algorithm (NA), similar to genetic or evolutionary algorithms, is used for automatic calibration of Stratigraphic Forward Models (SFM) to data constraints. The modified NA comprises explicit escape clauses from local minima and admissible solutions, thereby preventing a natural tendency of conventional NAs to converge and oversample a single minimum. The density of models in parameter space is used to define local minima. Admissible solutions are defined by considering error thresholds taking into account that SFM may be imperfect and that calibration constraints may be uncertain. The modified NA algorithm obtains a plurality of geological scenarios that agree with the data, and which can be used for further analysis and prediction.

20 Claims, 3 Drawing Sheets

(56) References Cited

U.S. PATENT DOCUMENTS

| | | | | |
|---|---|---|---|---|
| 5,844,799 | A * | 12/1998 | Joseph | G01V 1/282 |
| | | | | 702/2 |
| 6,246,963 | B1 | 6/2001 | Cross et al. | |
| 7,043,367 | B2 * | 5/2006 | Granjeon | G01V 99/005 |
| | | | | 702/2 |
| 7,373,251 | B2 * | 5/2008 | Hamman | G01V 1/306 |
| | | | | 367/73 |
| 7,925,481 | B2 * | 4/2011 | Van Wagoner | G01V 1/282 |
| | | | | 703/10 |
| 8,082,995 | B2 * | 12/2011 | Symington | E21B 43/24 |
| | | | | 166/302 |
| 8,776,895 | B2 * | 7/2014 | Li | E21B 47/00 |
| | | | | 166/369 |
| 2009/0319243 | A1 * | 12/2009 | Suarez-Rivera | E21B 43/00 |
| | | | | 703/10 |
| 2010/0057418 | A1 * | 3/2010 | Li | E21B 47/00 |
| | | | | 703/10 |
| 2010/0274543 | A1 * | 10/2010 | Walker | G01V 99/00 |
| | | | | 703/6 |
| 2011/0054869 | A1 * | 3/2011 | Li | G06F 17/5009 |
| | | | | 703/10 |
| 2011/0061860 | A1 * | 3/2011 | Dean | E21B 43/00 |
| | | | | 166/250.01 |
| 2012/0022841 | A1 * | 1/2012 | Appleyard | G06F 17/12 |
| | | | | 703/2 |

OTHER PUBLICATIONS

Bornholdt, S., U. Nordlund, and H. Westphal, 1999, Inverse stratigraphic modeling using genetic algorithms, in J.W. Harbaugh, W.L. Watney, E.C. Rankey, R. Slingerland, R.H. Goldstein, and E.K. Franseen, eds., Numerical Experiments in Stratigraphy: Recent Advances in Stratigraphic and Sedimentologic Computer Simulation, v. 62: Tulsa, SEPM Special Publications, p. 85-90.

Burgess, P.M., H. Lammers, C. van Oosterhout, and D. Granjeon, 2006, Multivariate sequence stratigraphy: Tackling complexity and uncertainty with stratigraphic forward modeling, multiple scenarios, and conditional frequency maps: AAPG Bulletin, v. 90, p. 1-19.

Burgess, P.M., and R. Steel, 2008, Stratigraphic forward modeling of basin-margin clinoform systems: implications for controls on topset and shelf width and timing of formation of shelf-edge deltas, SEPM Special Publication 90.

Charvin, K., K. Gallagher, G.L. Hampson, and R. Labourdette, 2009a, A Bayesian approach to inverse modelling of stratigraphy, part 1: method: Basin Research, v. 21, p. 5-25.

Charvin, K., K. Gallagher, G.L. Hampson, and R. Labourdette, 2009b, A Bayesian approach to inverse modelling of stratigraphy, part 2: validation tests: Basin Research, v. 21, p. 27-45.

Charvin, K., G.J. Hampson, K. Gallagher, J.E.A. Storms, R. Labourdette, 2011, Characterization of controls on high-resolution stratigrahic architecture in wave-dominated shoreface-shelf parasequences using inverse numerical modeling: Journal of Sedimentary Research, v. 81, p. 562-578.

Cross, T.A., M.A. Lessenger, 1999, Construction and application of a stratigraphic inverse model, in J. W. Harbaugh, W.L. Watney, E.C. Rankey, R. Slingerland, R.H. Goldstein, and E.K. Franseen, eds., Numerical Experiments in Stratigraphy: Recent Advances in Stratigraphic and Sedimentologic Computer Simulation, v. 62: Tulsa, SEPM Special Publications, p. 69-83.

Euzen, T., P. Joseph, E. Du Fornel, S. Lesur, D. Granjeon, and F. Guillocheau, 2004, Three-dimensional stratigraphic modelling of the Grès d'Annot system, Eocene-Oligocene, SE France, in P. Joseph, and S. Lomas, eds., Deep-water sedimentation in the Alpine Foreland Basin of SE France: New perspectives on the Grès d'Annot and related systems, v. 221, Geological Society Special Publications, p. 161-180.

Granjeon, D., 1997, Modelisation stratigraphique deterministe—conception et applications d'un modele diffusif 3D multilithologique, Rennes, 189 p.

Granjeon, D., and P. Joseph, 1999, Concepts and applications of a 3-D multiple litology, diffusive model in stratigraphic modeling, in J.W. Harbaugh, and et al., eds., Numerical Experiments in Stratigraphy: Recent Advances in Stratigraphic and Sedimentologic Computer Simulations, v. 62, SEPM Special Publication, p. 197-210.

Gratacós, O., K. Bitzer, L. Cabrera, and E. Roca, 2009, SIMSAFADIM-CLASTIC: a new approach to 3D forward mathematical simulation for clastic and carbonate sedimentation: Geologica Acta.

Griffiths, C.M, Dyt, C., Paraschivoiu, E., and Liu, K., 2001, SEDSIM in Hydrocarbon Exploration. In: Merriam, D., Davis, J.C. (Eds). Geologic Modeling and Simulation. Kluwer Academic, New York.

Hasler, C.A., E.W. Adams, R.A. Wood, and T. Dickson, 2008, Fine-scale forward modeling of a Devonian patch reef, Canning Basin, Western Australia, in P. de Boer, G. Postma, K. Van der Zwan, P. Burgess, and P. Kukla, eds., Analogue and numerical modelling of sedimentary systems: from understanding to prediction, v. 40, International Assocation of Sedimentology, p. 37-40.

Hutton, E.W.H., and J.P. Syvitsky, 2008, Sedflux 2.0: An advanced process-response model that generates three-dimensional stratigraphy: Computers & Geosciences, v. 34.

Imhof, M., and A. K. Sharma, 2006, Quantitative seismostratigraphic inversion of a prograding delta from seismic data: Marine and Petroleum Geolgy, v. 23, p. 735-744.

Imhof, M.G., Sharma, A.K. (2007). Seismostratigraphic inversion: Appraisal, ambiguity, and uncertainty. Geophysics, 72-4, R51-R66.

Kubo, Y., J.P. Syvitsky, E.W.H. Hutton, and C. Paola, 2005, Advance and application of the stratigraphic simulation model 2D-SedFlux: From tank experiment to geological scale simulation: Sedimentary Geology, v. 178, p. 187-195.

Lawrence, D.T., M. Doyle, and T. Aigner, 1990, Stratigraphic simulation of sedimentary basins—concepts and calibrations: AAPG Bull, v. 74, p. 273-295.

Lessenger, M., and T.A. Cross, 1996, An Inverse Stratigraphic Simulation Model—Is Stratigraphic Inversion Possible?: Enery Exploration Exploitation, v. 14, p. 627-637.

Paola, C., 2000, Quantitative models of sedimentary basin filling: Sedimentology, v. 47, p. 121-178.

Prather, B.E., 2000, Calibration and visualization of depositional process models for above-grade slopes: a case study from the Gulf of Mexico: Marine and Petroleum Geology, v. 17, p. 619-638.

Sambridge, M., 1999a, Geophysical inversion with a neighborhood algorithm—Searching a parameters space: Geophysical Journal International, v. 138, p. 479-494.

Sambridge, M., 1999b, Geophysical inversion with a neighborhood algorithm—II. Appraising the ensemble: Geophysical Journal International, v. 138, p. 727-746.

Sambridge, M., and K. Mosegaard, 2002, Monte Carlo methods in geophysical inverse problems: Reviews of Geophysics, v. 40.

Sharma, A.K., 2006, Quantitative stratigraphic inversion, Blacksburg, 91 p.

Sharma, A.K., and M. Imhof, 2007, Quantitative stratigraphic inversion: Case Study using Jurassic Tank Data: SEG Annual meeting.

Shuster, M.W., and T. Aigner, 1994, Two-Dimensional Synthetic Seismic and Log Cross Sections from Stratigraphic Forward Models: AAPG Bulletin, v. 78, p. 409-431.

Syvitski, J.P.M., Hutton, E.W.H., 2001. 2D SEDFLUX 1.0C: an advanced process-response numerical model for the fill of marine sedimentary basins. Computers & Geosciences 27 (6), p. 731-754.

Teles, V., R. Eschard, G. Etienne, S. Lopez, and A. Arnaud-Vanneau, 2008, Carbonate production and stratigraphic architecture of shelf-margin wedges (Cretaceous, Vercors): lessons from a stratigraphic modelling approach: Petroleum Geoscience, v. 14, p. 263-271.

Warrlich, G., D. Bosence, D. Waltham, C. Wood, A. Boylan, and B. Badenas, 2008, 3D stratigraphic forward modelling for analysis and prediction of carbonate platform stratigraphies in exploration and production: Marine and Petroleum Geolgy, v. 25, p. 35-38.

Watney, W., E. Rankey, and J. W. Harbaugh, 1999, Perspectives on stratigraphic simulation models, in J. W. Harbaugh, W.L. Watney, E.C. Rankey, R. Slingerland, R.H. Goldstein, and E.K. Franseen, eds., Numerical Experiments in Stratigraphy: Recent Advances in

(56) References Cited

OTHER PUBLICATIONS

Stratigraphic and Sedimentologic Computer Simulation, v. 62: Tulsa, SEPM Special Publications, p. 3-20.

Williams, H.D., P.M. Burgess, P. Wright, G. Della Porta, and D. Granjeon, 2011, Investigating carbonate platform types: multiple controls and a continuum of geometries: Journal of Sedimentary Research, v. 81.

Wijns, C., T. Poulet, F. Boschetti, C. Dyt, and C. M. Griffiths, 2004, Interactive inverse methodology applied to stratigraphic forward modelling, in A. Curtis, and R. Wood, eds., Geological Prior Information: Informing Science and Engineering, v. 239: London, Geological Society Special Publications, p. 147-156.

Wendebourg, J., and J.W. Harbaugh, 1996, Sedimentary process simulation: a new approach for describing petrophysical properties in three dimensions for subsurface flow simulations, in A. Förster, and D. F. Merriam, eds., Geologic Modeling and Mapping.

\* cited by examiner

AUTOMATED CALIBRATION OF A STRATIGRAPHIC FORWARD MODELLING (SFM) TOOL USING A NEIGHBORHOOD ALGORITHM WITH EXPLICIT ESCAPE CLAUSES

PRIORITY CLAIM

The present application is a National Stage (§ 371) application of PCT/EP2012/076087, filed Dec. 19, 2012, which claims priority from European Application 11194667.9, filed Dec. 20, 2011, each of which are hereby incorporated by reference in their entirety.

BACKGROUND OF THE INVENTION

The present invention relates to a method for automated calibration of a Stratigraphic Forward Modelling (SFM) tool to available geological input data using a Neighborhood Algorithm (NA) with explicit escape clauses.

Calibration of a SFM tool refers to the process of obtaining a SFM that honors a given set of geological input data constraints and uncertainties, which cannot be imposed directly as input parameters to the SFM tool.

Cross and Lessenger disclose in U.S. Pat. No. 6,246,963 a SFM tool which inverts a stratigraphic/sedimentologic forward model with simultaneous multi-parameter inversion or other mathematical optimization techniques, such that forward model predictions are forced to obtain best match with observations. A disadvantage of this known SFM tool is that it has a natural tendency to converge to a single minimum. In addition to the focus on finding a single best solution (i.e. global minima) the 2D approach of the forward model is another main limitation of this known SFM tool.

This and other SFM prior art references are listed at the end of this specification.

Throughout other parts of this specification references to the listed prior art references are abbreviated by indicating the name of one or more authors and the year of publication. For example, a reference in the following paragraph to the listed prior art reference presented by Paola, C., 2000, Quantitative models of sedimentary basin filling: Sedimentology, v. 47, p. 121-178 is abbreviated as (Paola, 2000).

Stratigraphic Forward Modelling (SFM) tools are numerical, process-based software that aim to simulate tectonic and sedimentary processes controlling stratigraphic architecture (Paola, 2000). These tools can be classified according to the processes affecting sediment production, transport and deposition that they simulate, as well as the degree of the simplifications of these processes (Watney et al., 1999). SFM have been widely used to understand and illustrate controls on stratigraphy for a variety of sedimentary environments (Paola, 2000; Prather, 2000; Kubo et al., 2005; Burgess et al., 2006; Burgess and Steel, 2008; Williams et al., 2011). Currently, there are a variety of SFM used in the context of hydrocarbon exploration, for building basin models or to help in predicting reservoir presence and characteristics, such as DIONISOS (Granjeon, 1996; Joseph et al., 1998; Granjeon and Joseph, 1999), SEDSIM (Wendebourg and Harbaugh, 1996; Griffiths et al., 2001), or SEDFLUX (Syvistski and Hutton, 2001; Hutton and Syvistki, 2008).

Using SFM tools to describe local geology while systematically honoring given input data constraints (Lawrence et al., 1990; Shuster and Aigner 1994; Granjeon and Joseph, 1999), and understanding the sensitivities of these SFM models to input parameters difficult to infer directly from subsurface data (such as initial bathymetry, input sediment composition, rates of fluvial discharge, or transport efficiency parameters) is an "inverse problem". Solving the SFM inverse problem is very challenging because: a) the SFM are not linear processes hence inversion is non-linear also, typically exhibiting very complex multi-modal error functions; b) SFM used for hydrocarbon exploration problems are often large-scale and large timescale, with significant computing resources required, and feature many unknowns; c) assessing the sensitivity of geological models to unknown parameters is non-trivial, and d) solutions are fraught with uncertainty due to sparse or imperfect data as well as imperfect modeling (SFM).

The most straightforward conventional approach to calibrate SFM tools is by manual trial and error. This approach has been widely applied (Euzen et al., 2004; Wijns et al., 2004; Warrlick et al., 2008; Teles et al., 2008; Hasler et al., 2008; Gratacos et al., 2009), and is included in U.S. Pat. No. 5,844,799 by Joseph et al., (1998). Manual trial and error is time consuming, prone to subjective user bias, and hence may not lead to optimal solutions. Some automatic inversion approaches to the calibration of SFM have been also employed; these are based on quantifying the degree to which existing models are consistent with the input data constraints using an objective- or error function, and iteratively testing new models aiming to minimize the error function evaluation. Such approaches mostly differ in the specifications of the error function and in the procedure to propose new models:

1) Lessenger and Cross (1996) used a deterministic gradient-descend method to invert 2D synthetic data using a SFM that predicts distributions of fluvial/coastal plain through shallow shelf facies tracts.

2) Cross and Lessenger (1999 and 2001) developed and patented, by means of the earlier described U.S. Pat. No. 6,246,963, an inversion algorithm based on gradient descent coupled to a 2D forward model of siliciclastic through marine shelf environments, and applied it to a 2D outcrop-based example. They incorporated into the solution an explicit method to escape local minima based on generating a coarse linear search independently for each parameter (other parameters being held constant) once every few iterations; referred to as Lerche inversion algorithm. As indicated earlier, the 2D approach of the forward model and the focus on finding a single best solution (i.e. global minima) are the main limitations of this known technique.

3) Charvin et al., (2009a and b) developed an inversion method based on a Markov-Chain Monte-Carlo method. They applied this method to the inversion of 2D synthetic data and outcrop data (Charvin et al., 2011) using a model of wave-dominated shallow-marine deposits.

4) Bornholdt et al., (1999) used a genetic algorithm to invert for 2D data in a carbonate margin. Genetic algorithms are similar to the neighborhood algorithm used in the present invention, in that they select only the best models to generate the next iteration of models. However, the next generation of models in genetic algorithms is based on cross-over and mutation from the best models so far, whereas in neighborhood algorithms the new models are simply drawn from the neighborhoods of the best models.

5) Sharma (2006), Imhof and Sharma (2006 and 2007), and Sharma and Imhof (2007) applied the neighborhood algorithm (NA) from Sambridge (1999a, 1999b), which is a direct-search optimization method. At each iteration of the original NA algorithm, the all-time best Nr models are identified, and each such model spawns Ns new models in its neighborhood; the neighborhoods are defined by the Voronoi tessellation of the ensemble of models and the sampling thereof is random. The new models are added to the current ensemble, the Voronoi tessellation is updated, and the whole process is repeated for several iterations. Sharma (2006) and Sharma and Imhof (2007) inverted the results of a laboratory flume experiment simulating a deltaic system honoring measured sediment thickness. Imhof and Sharma (2006 and 2007) inverted a delta calibrated by bedding attitude constraints derived from real seismic. In both cases, the SFM they used was based on a generalized diffusion with flux depending on topographic gradient but without the capability to differentiate lithologies. In order to mitigate the tendency of the original NA to become trapped by local minima, Imhof and Sharma (2006) and (2007) introduced the following modification: at each generation, a fraction of newly generated models are sampled around random models, instead of being sampled in the neighborhood of the best models so far.

There is a need to modify an evolutionary-genetic algorithm such as the original neighborhood algorithm (NA) by Sambridge (1999a) for calibration of stratigraphic forward models to data constraints. The original NA algorithm has been tested in the past for inverting SFM (Imhof and Sharma, 2006; 2007; Sharma, 2006; Sharma and Imhof, 2007). This original NA algorithm tends to be strongly attracted to a single minimum, which undermines its efficiency in the presence of very complex or multimodal error functions, as is common in SFM. One approach to mitigate this tendency is to mix subset of best models with a subset of totally random models, irrespective of their error values, as proposed by Imhof and Sharma (2006 and 2007); however this mechanism undermines the efficiency of the original NA algorithm because of the pure randomization, while not preventing oversampling of low-error regions, which tends to trap the algorithm very few local minima.

In summary, because geology is very complex, realistic process-based Stratigraphic Forward Modeling (SFM) models are necessarily complex too. SFM are directly controlled by parameters describing the geological processes simulated (i.e. input bathymetry, sediment supply rate, etc.); but in some cases it is also useful that these models are calibrated to available data such as seismic data and well data or other types of geological prior information, that cannot be used directly as input parameters for the SFM. This calibration can be achieved by using automatic inversion algorithms.

The SFM use approximations to the real processes governing sediment production, transport and sedimentation; and calibration data are comparatively sparse, uncertain, and often measured at different scales than the model prediction scales. Therefore, the distribution of admissible solutions to the inversion problem is typically multimodal because the models cannot predict with complete accuracy. This means that classical optimization techniques may miss some of the potential solutions; hence a multimodal approach is called for, such as evolutionary or genetic algorithms. Still, neighborhood search techniques, even multimodal, can get trapped by local minima, such techniques can waste significant modeling cycles oversampling local minima in an attempt to refine potential solutions and lower the error a bit further, instead of exploring for other potential new solutions—this is known as the "exploitation vs exploration" dilemma in optimization.

There is a need for a new approach to inhibit the tendency of conventional genetic or evoluteany algorithms such as the neighborhood algorithm (NA), to being attracted to a single minimum by identifying local minima and admissible solutions.

SUMMARY OF THE INVENTION

In accordance with the invention there is provided a method for automated calibration of a plurality of stratigraphic models to available geological data, such as geological prior information, well logs and/or seismic data, and any uncertainties relating to the available geological data, the method comprising the steps of:

a) providing a process-based SFM tool that generates a stratigraphic model of a geological evolution and fill of a sedimentary basin on the basis of at least one set of input tectonic and sedimentary process parameters;

b) providing a conditional sampling algorithm that tests different sets of input process parameters to the SFM tool, by sampling neighborhoods of those input sedimentary process parameter sets that yield stratigraphic models with best agreement to the available geological data;

c) providing a local minima explicit escape clause of the conditional sampling algorithm, which escape clause identifies local minima that are defined as models in a densely sampled region of the parameter space with an agreement to calibration data that does not meet the error threshold criteria to be admissible solutions, yet exhibit a lower error than neighbouring models, and forbids the oversampling of said minima, thereby allowing the sampling algorithm to contine the search in other regions of probable solutions;

d) providing a solution explicit escape clause of the conditional sampling algorithm, which identifies admissible solutions that are defined as models with an agreement to calibration data that meet a predefined error threshold, and which then prevents the algorithm from oversampling said admissible solutions; and e) iterating steps b, c and d a number of times in order to identify a plurality of admissible stratigraphic models that are calibrated to the available geological data.

The method according to the present invention preferably provides a 3D SFM technique, since 2D simplifications cannot realistically depict some of the geological processes and hence have limited predictive value.

The method according to the present invention uses explicit escape clauses to identify local minima and admissible solutions when using evolutionary or genetic inversion algorithms, such as the conditional sampling algorithm that is also referred to as the Neighborhood Algorithm (NA).

In the method according to the invention local minima may be identified as models with an agreement to available geological data that is better than that of neighboring models in the parameter space; even though other points with better agreement might exist further away.

Local minima are identified according to the sampling density of the models in parameter space. Admissible solutions are identified accounting for the fact that data is uncertain and the SFM is imperfect by using an explicit error tolerance or threshold. Finally, the algorithm generates a plurality of admissible solutions instead of looking for a single best solution.

In the method according to the invention admissible solutions may be defined as models with an agreement to available geological data that is below a predefined error threshold.

Both escape clauses promote an efficient multi-modal inversion, by not over-exploiting visited local minima and admissible solutions, and promoting the exploration of new promising areas of solution space.

We note that the escape clauses in the method accordance with the invention are not purely random as in Imhof and Sharma (2006) and (2007). The aforementioned modification of Imhof and Sharma (2006) and (2007) to NA, while randomizing some models at each iteration and hence promoting "exploration" to some extent, does not explicitly forbid oversampling of low-error regions. Therefore, in the long run even the random models have an increasingly large probability of being drawn inside an already-visited low-error region.

It is furthermore observed that in order to define explicit escape clauses, it is generally useful to be able to measure the local density of models and the capability to identify admissible models.

The method according to the invention provides a new approach to deal with the tendency of multimodal genetic or evolutionary algorithms, and NA in particular, to being attracted to a single minimum by identifying local minima and admissible solutions. Local minima are defined as low-error models located in regions of the parameter space the neighborhoods of which have been already densely sampled. Admissible models have a good enough fit to the calibration data. The definition of admissible models requires using error thresholds. Once local minima and admissible models are identified, the inversion algorithm explicitly forbids oversampling their neighborhoods by means of escape clauses, which redirect the search to new promising areas of solution space. The use of error thresholds reflects the fact that SFM are imperfect, and calibration data uncertain. Error thresholds are also used in order to normalize errors such that error measures with different magnitudes can be combined. The outcome of the modified NA algorithm is a set of admissible models that agree with the data constraints (within tolerance, as specified by the aforementioned error thresholds), which can be used for further predictions or to understand the sensitivities of the studied system.

The stratigraphic forward models may be calibrated against well log data, seismic data, or other geophysical or petrophysical or geological data, specific calibration data comprising but not being restricted to:
a) thicknesses measured at well locations,
b) thicknesses measured from two-dimensional and three-dimensional seismic data,
c) thicknesses measured from other potential field or remote sensing application (such as gravity or electromagnetics),
d) thicknesses measured at outcrop exposures,
e) proportions of a specific rock type or facies measured at well locations,
f) proportions of a specific rock type or facies derived from seismic attributes,
g) proportions of specific sediment classes measured from outcrop exposures, and
h) presence of any other architectural, geomorphologic or petrographic elements as identified from seismic, wells and outcrop exposures and that can be predicted by the stratigraphic forward model.

These and other features, embodiments and advantages of the SFM tool calibration method according to the invention are described in the accompanying claims, abstract and the following detailed description of non-limiting embodiments depicted in the accompanying drawings, in which description reference numerals are used which refer to corresponding reference numerals that are depicted in the drawings. Similar reference numerals in different figures denote the same or similar objects.

DETAILED DESCRIPTION OF THE DEPICTED EMBODIMENTS OF THE INVENTION

Figure 1:
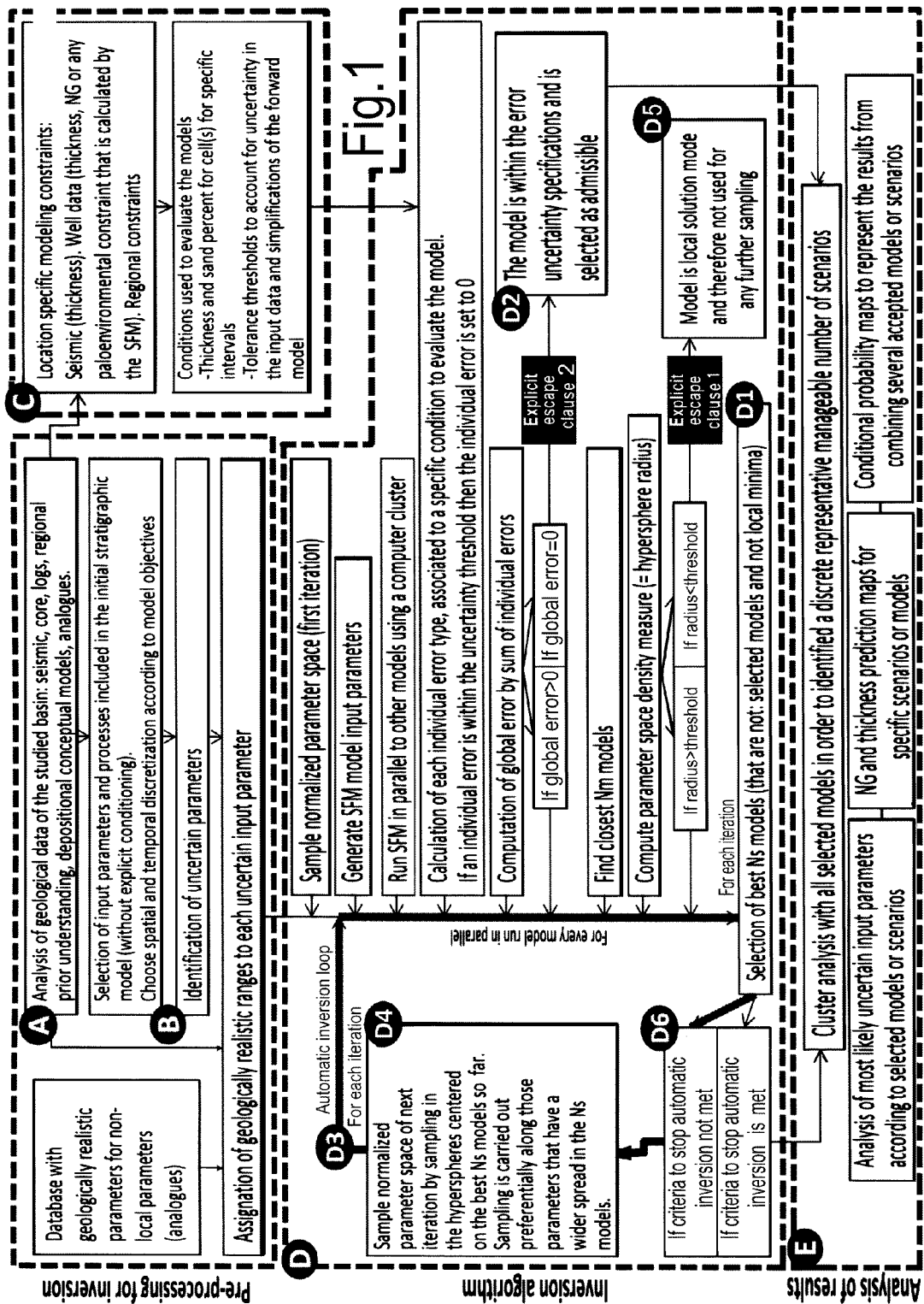
FIG. 1 is a flowchart illustrating one embodiment of the SFM calibration tool according to the invention.
Figure 2:
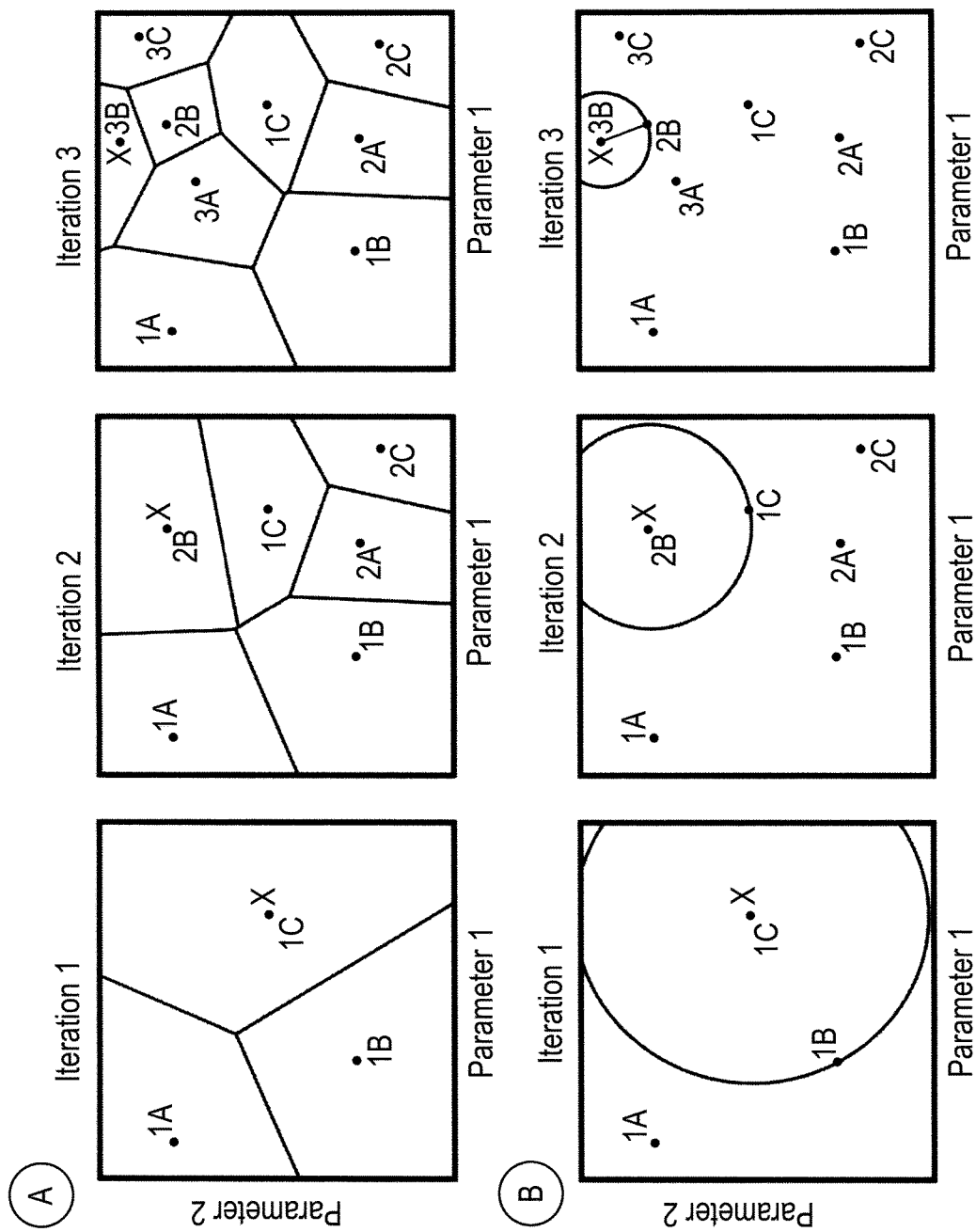
FIG. 2 illustrates the mechanics of the inversion algorithm for generating new models.
Figure 3:
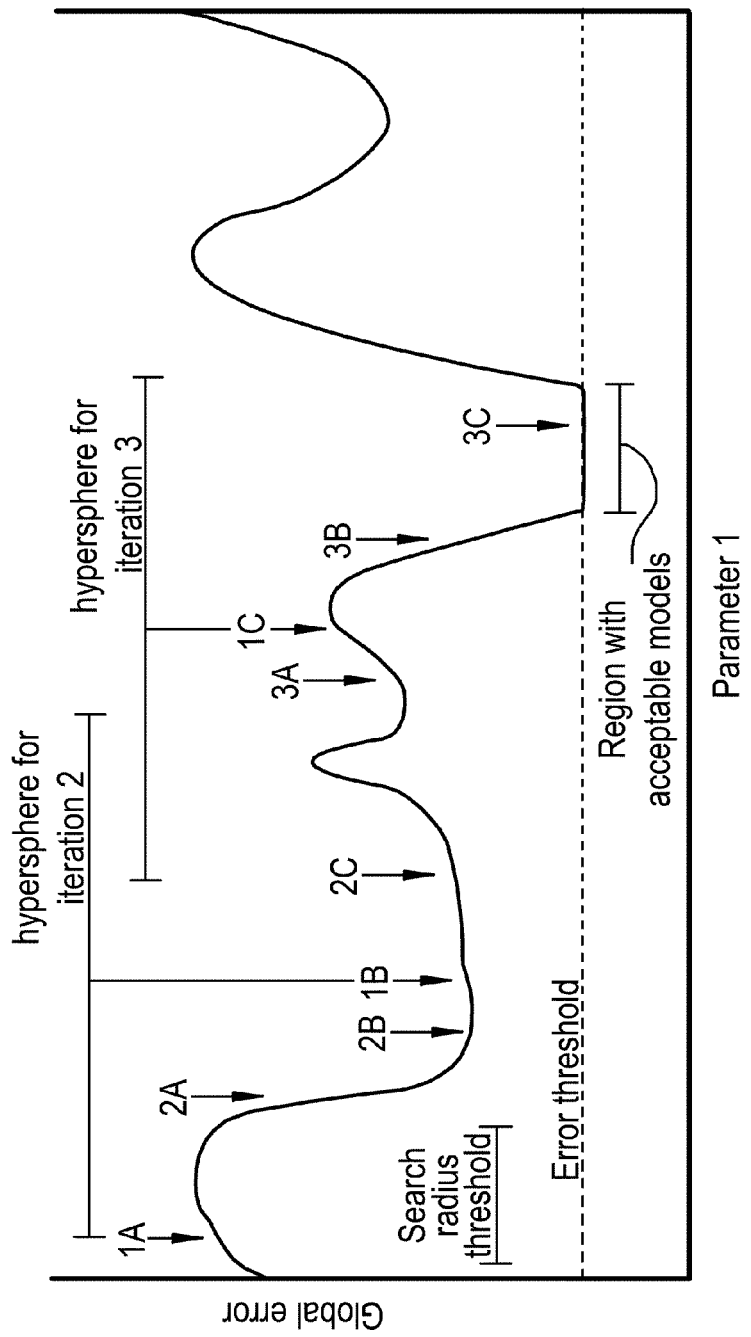
FIG. 3 illustrates the mechanics of the explicit clauses for escaping local minima and admissible solutions.

FIGS. 1-3 illustrate various aspects of the SFM automatic inversion tool and associated workflow according to the invention.

FIG. 1 shows a workflow for the automated calibration of Stratigraphic Forward Models (SFM) tool according to the invention.

FIG. 2 illustrates the mechanics of the inversion algorithm for generating new models: A) the original neighborhood algorithm by Sambridge (1999a) using Voronoi cells (convex polytopes) as neighborhoods, and B) a variant using generalized hypervolumes, such as hyperspheres, as neighborhoods in embodiments of the method according to the invention. In both cases three iterations are shown. Note that the values of parameter 1 and 2 are constrained to lie within the boundaries defined by the box. Each model is characterized by a set of process parameters, which is a point in parameter space. Ns equals 3, and Nr equals to 1. The model nomenclature (1A, 1B . . . ) reflects the iteration (number) and the model (letter). The Voronoi polygons after each iteration are shown in A. The hyperspheres around the best model with a radius defined by the average distance of the closest point (Nm is set to 1) are shown in B. The model denoted by the cross "X" corresponds to the model with lowest error at each iteration.

FIG. 3 illustrates the mechanics of the explicit clauses for escaping local minima and admissible solutions. The example is for only one parameter (1D). The dashed line corresponds to the error function for each location of the parameter space. Ns equals 3, Nr equals 1, and Nm equals 1. Models 1A, 1B and 1C correspond to the first iteration, and are randomly sampled from the entire parameter space. The lowest error model after the first iteration is 1B. The models for the second iteration are sampled from the neighborhood around 1B (which using only one parameter corresponds to a line). In the third iteration the lowest error model is 2B, but the distance to the closest model is smaller than the search radius threshold, therefore 2B is classified as local minima, and not used to generate new models; similarly, 2C is also a local minima. As a consequence, models for the third iteration are sampled from the neighborhood around 1C, which has the lowest error without being classified as local minima. This example illustrates the shifting of the parameter search from the neighborhood of 1B to that of 1C. In the fourth iteration, the models will be sampled around 3B, because model 3C has an error smaller than the maximum threshold and therefore is classified as an admissible solution and is not used to spawn new models.

Reference is now made to FIG. 1.

FIG. 1 shows that the workflow for the automated calibration of stratigraphic forward models (SFM) in this invention comprises five steps:

Step 1—Data analysis: analysis of available data in the studied basin (such as seismic sections, well logs and cores, etc); and selection of input parameters and processes that need to be included in the SFM (FIG. 1, Tag A).

Step 2—Uncertain parameters: Identification of uncertain parameters in the SFM and assignation of a prior range of geologically realistic values (FIG. 1, Tag B). Ranges can be estimated from previous experience, literature reviews, or simple calculations. These are the parameters that the inversion algorithm will test and search optimal values for, in step 4.

Step 3—Calibration constraints: Identification of the data or observations that we want the models to honor (i.e. calibration constraints), and specification of the error functions to be minimized in step 4 (FIG. 1, Tag C).

Step 4—Inversion algorithm: Run the inversion algorithm until a number of admissible models are obtained (i.e. models that are consistent with the calibration constraints) (FIG. 1, Tag D)

Step 5—Results analysis: Analysis of admissible models. The analysis of admissible models can include cluster analysis in the parameter space in order to identify a manageable number of discrete scenarios, the generation of summary maps for specific models and properties, and/or the generation of posterior probability maps (Burgess et al., 2006) in order to collapse the results of many models into a single set of maps (FIG. 1, Tag E).

The invention described herein differentiates itself from prior attempts to obtain calibrated SFM mainly in step 3 and 4. Therefore these steps 3 and 4 are described in more detail below.

Step 3—Calibration Constraints

Error functions are defined to quantitatively assess how well a model honors a specific set of calibration constraints.

Error functions in the inversion algorithm used in Step 4 (see below) are only employed to rank the models generated, and select those models that better honor the calibration constraints. In turn, these seed models are used to spawn new parameter sets for successive iteration trials (FIG. 1, Tag D1). Therefore, the focus in the definition of errors is on model ranking and not on the absolute values of the errors.

Only one global error function is minimized during the inversion algorithm used in Step 4 (see below). This error function can result from the combination of different error types (for instance, through summation of individual, normalized errors), so that all are simultaneously minimized during the inversion process.

Each error type corresponds to a specific constraint that we want the models to honor (such as average sand percent, average thickness, sand percent variability, etc., as illustrated in FIG. 1, Tag C). Error types can be defined for specific locations and time intervals, either for parts of the model or for the entire model.

For each error type, a threshold needs to be defined. This threshold corresponds to the maximum tolerated mismatch between the actual constraints and the values predicted by the models. If all the individual errors are below their associated threshold, then a model will be considered as admissible by the inversion algorithm (as illustrated in FIG. 1, Tag D2). Conversely, models with any of the errors above a given threshold are not admissible.

In order to combine different error types (i.e. of different magnitudes or units) into a single global error function, each individual error needs to be normalized to be made comparable to other error types. The normalization is carried out by dividing each individual error by its associated threshold. If the individual error is smaller than the threshold, then the normalized value is set to a constant, so that the individual error do does not contribute to the total error.

Using a flat error function when an individual error falls below the admissible threshold, explicitly accounts for the fact that in a hydrocarbon exploration context, 1) data are imperfect and 2) the SFM models represent a simplification of real processes; therefore it do not makes sense to over fit the models to the calibration constraints below admissible certain tolerance or threshold. Additionally, this feature pushes the inversion process to minimize individual errors that still do not meet the threshold.

Step 4—Inversion Algorithm

The inversion algorithm used for the automatic calibration of SFM (FIG. 1, Tag D) is a modification of the original derivative-free neighborhood algorithm (NA, Sambridge 1999a and b), and it is used to obtain those sets of uncertain parameter values that minimize the errors as described above.

NA is essentially a random walk algorithm in parameter space, which at each new iteration evaluates multiple models resulting from perturbing the input parameters of some of the models attempted in the previous iterations. The original NA algorithm has been tested in the past for inverting SFM models (Imhof and Sharma, 2006; 2007; Sharma, 2006; Sharma and Imhof, 2007).

At each generation of the original NA algorithm, the all-time best Nr models are identified, and each such model spawns Ns new models in its neighborhood (FIG. 2A); the neighborhoods are defined by the Voronoi tessellation of the ensemble of models and the sampling thereof is random (Sambridge 1999a). The new models are added to the current ensemble, the Voronoi tessellation is updated, and the whole process is repeated (FIG. 1, Tag D3; FIG. 2A). The rationale of the NA inversion algorithm is to preferentially sample those regions within the parameter space that yielded the lowest errors so far.

NA lends itself to parallelization using computer clusters with a node devoted to each of the Ns models.

The rate of convergence and the so-called exploration versus exploitation behavior of the algorithm are controlled by the ratio Ns/Nr (Sambridge and Mosegaard, 2002). A small ratio yields a more exploratory character of the algorithm, in which more models will be tested before converging to the lowest error regions of the objective function (resulting in a slower convergence rate), by way of a larger probability of escaping local minima. Conversely, a larger rate will yield faster convergence, but with larger probability of getting trapped into local minima, leading to over fitting.

The neighborhood search area (i.e. the Voronoi cell around a model selected to generate a new parameter set) is derived from the previous sampling configurations, and therefore does not need to be imposed externally but is adaptive. Sampling in sparsely sampled regions of parameter space will lead to large search areas, whereas sampling in densely sampled regions will lead to small search areas.

As described above, the main disadvantage of the original NA algorithm is that it tends to be strongly attracted to a single minimum. This can be mitigated by sampling not only the best model, at a given iteration, but a collection of best models (i.e. Nr>>1). However, because best models lead to more trial models in their vicinity and in turn oversampled regions of solution space lead to small search areas, by construction models ultimately get trapped around a unique minimum. One approach to mitigate this tendency is to mix a subset of best models with a subset of purely random models, irrespective of their error values, as proposed by Imhof and Sharma (2006 and 2007). Despite providing an escape mechanism, the pure randomization undermines the efficiency of the original NA algorithm, and still does not prevent oversampling of low-error regions.

To mitigate the tendency of NA to get trapped in this way and to promote sampling of multiple models with admissible error (instead of a single best model), while retaining the efficiency of the original NA algorithm and its ability to handle high-dimensional problems (D>>10), this invention proposes the following upgrades to the original NA algorithm:

1) Explicit escape clause 1: A threshold is imposed on the minimum hypervolume of the neighborhood around a selected model. In case a hypersphere is used to define the neighborhood, then its radius can be used as a proxy for the hypervolume. When the model density is such that this threshold is met, the point is classified as a local minima and it is not used to generate any new models, regardless of its error function value (FIG. 1, Tag D5). This criterion stops the search for lower errors in areas around points that have been already densely sampled and, importantly, shifts the search to other regions in the parameter space (FIG. 3). The latter is a key feature of the invention, which allows the search to move out of local minima and promotes exploration of more sparsely sampled, yet prospective (in terms of low error) regions of the parameter space. Note that the present invention differs from the method of Imhof and Sharma (2006) and (2007), in that it 1) explicitly forbids revisiting local minima and thus avoids oversampling, which tends to trap the NA algorithm, and 2) having done that, proceeds with the next best candidate models (in terms of low error), rather than purely random models. In summary, the present invention strikes a desired balance between exploitation and exploration; in contrast, the method of Imhof and Sharma (2006) and (2007) does not prevent over-exploitation of local minima, while the purely random exploratory models risk getting lost in high-error regions of parameter space, or being statistically drawn to oversampled local minima. A well-balanced exploration versus exploitation behavior is critical when working efficiently with rough error functions, which commonly arise in the inversion of SFM because of the aforementioned modeling complexity and the data sparseness and uncertainty. This modification represents a crucial change in the driving philosophy behind the original NA, as it assumes that lower error models can still be found outside of the lowest error regions sampled so far, and promotes a fast search of an ensemble of distinct, admissible solutions.

2) Explicit escape clause 2: A model is selected as admissible if all the individual errors defined are below the corresponding threshold (FIG. 1, Tag D2). In this case the model is not used to seed further models in its vicinity, similar to the treatment of local minima. This reflects the underlying assumption that when certain error ranges are met, further minute refinements of the model to better match the data are unnecessary due to the inherent uncertainty surrounding SFM models and data; instead the inversion algorithm promotes exploration of the next best regions in terms of low error (FIG. 3), aiming to obtain a large number of different admissible models that sample all the potential admissible geological scenarios.

3) Instead of sampling the Voronoi cell of a selected model (as in the original NA algorithm), the sampling for a new model is carried out in the neighborhood of the seed model. In one embodiment of the invention, the neighborhood is defined by a hypersphere. Hyperspheres are computationally simpler to define than Voronoi cells or other neighborhood definitions in high-dimensions. The radius of the hypersphere, which is controlled by the average distance of the Nm nearest neighbor models (FIG. 1, Tag D4; FIG. 2B), is also used to identify local minima in the explicit escape clause. In other embodiments of this invention we use other definitions of the neighborhood of a seed model: for instance, hyperellipses, or (convex) polytopes (n-dimensional generalization of polygons and polyhedral)

The inversion algorithm is run for several iterations until a stopping criterion is met (FIG. 1, Tag D6). Useful stopping criteria are the number of admissible models obtained, the number of iterations, or the number of iterations without obtaining a new admissible model. The outcome of the inversion algorithm is then an ensemble of selected models that are consistent with all the individual error definitions, which can be used for further analysis (FIG. 1, Tag E).

Modification of the Inversion Workflow to Account for Multiple Independent Stratigraphic Units In the case that a SFM consists of multiple stratigraphic units, then the number of uncertain parameters increases significantly, because many of the parameters (such as sediment input rate, position of the sediment input sources, etc), need to be defined for each unit independently. In order to keep the number of uncertain parameters to be tested by inversion as manageable, the inversion algorithm can be run sequentially, one unit at a time, from the oldest units to the youngest.

While inverting the oldest stratigraphic unit, only those uncertain parameters that influence deposition in that unit need to be inverted, and the only errors considered are those related to that unit. Once a sufficient number of admissible models are obtained for that unit, inversion can proceed to the next unit by using the admissible models for the oldest unit as a starting point for the models of the next unit. For the inversion of the next unit, the parameters relating to the previous units are kept unchanged, and the inversion concentrates on varying the parameters of the unit being modeled. However, the errors considered are not only those relating to the new unit, but also those relating to the older units, in order to ensure that any new admissible model also meets the predefined error thresholds for the older units. This sequential process can be repeated for as many stratigraphic units as needed.

LIST OF CITED REFERENCES

Bornholdt, S., U. Nordlund, and H. Westphal, 1999, Inverse stratigraphic modeling using genetic algorithms, in J. W. Harbaugh, W. L. Watney, E. C. Rankey, R. Slingerland, R. H. Goldstein, and E. K. Franseen, eds., Numerical Experiments in Stratigraphy: Recent Advances in Stratigraphic and Sedimentologic Computer Simulation, v. 62: Tulsa, SEPM Special Publications, p. 85-90.

Burgess, P. M., H. Lammers, C. van Oosterhout, and D. Granjeon, 2006, Multivariate sequence stratigraphy: Tackling complexity and uncertainty with stratigraphic forward modeling, multiple scenarios, and conditional frequency maps: AAPG Bulletin, v. 90, p. 1-19.

Burgess, P. M., and R. Steel, 2008, Stratigraphic forward modeling of basin-margin clinoform systems: implications for controls on topset and shelf width and timing of formation of shelf-edge deltas, SEPM Special Publication 90.

Charvin, K., K. Gallagher, G. L. Hampson, and R. Labourdette, 2009a, A Bayesian approach to inverse modelling of stratigraphy, part 1: method: Basin Research, v. 21, p. 5-25.

Charvin, K., K. Gallagher, G. L. Hampson, and R. Labourdette, 2009b, A Bayesian approach to inverse modelling of stratigraphy, part 2: validation tests: Basin Research, v. 21, p. 27-45.

Charvin, K., G. J. Hampson, K. Gallagher, J. E. A. Storms, R. Labourdette, 2011, Characterization of controls on high-resolution stratigrahic architecture in wave-dominated shoreface-shelf parasequences using inverse numerical modeling: Journal of Sedimentary Research, v. 81, p. 562-578.

Cross, T. A., M. A. Lessenger, 1999, Construction and application of a stratigraphic inverse model, in J. W. Harbaugh, W. L. Watney, E. C. Rankey, R. Slingerland, R. H. Goldstein, and E. K. Franseen, eds., Numerical Experiments in Stratigraphy: Recent Advances in Stratigraphic and Sedimentologic Computer Simulation, v. 62: Tulsa, SEPM Special Publications, p. 70-83.

Cross, T. A., M. A. Lessenger, 2001, Method for predicting stratigraphy. U.S. Pat. No. 6,246,963 B1

Euzen, T., P. Joseph, E. Du Fornel, S. Lesur, D. Granjeon, and F. Guillocheau, 2004, Three-dimensional stratigraphic modelling of the Grès d'Annot system, Eocene-Oligocene, SE France, in P. Joseph, and S. Lomas, eds., Deep-water sedimentation in the Alpine Foreland Basin of SE France: New perspectives on the Grès d'Annot and related systems, v. 221, Geological Society Special Publications, p. 161-180.

Granjeon, D., 1996, Modelisation stratigraphique deterministe—conception et applications d'un modele diffusif 3D multilithologique, Rennes, 189 p.

Granjeon, D., and P. Joseph, 1999, Concepts and applications of a 3-D multiple litology, diffusive model in stratigraphic modeling, in J. W. Harbaugh, and et al., eds., Numerical Experiments in Stratigraphy: Recent Advances in Stratigraphic and Sedimentologic Computer Simulations, v. 62, SEPM Special Publication, p. 197-210.

Gratacós, O., K. Bitzer, L. Cabrera, and E. Roca, 2009, SIMSAFADIM-CLASTIC: a new approach to 3D forward mathematical simulation for clastic and carbonate sedimentation: Geologica Acta.

Griffiths, C. M, Dyt, C., Paraschivoiu, E., and Liu, K., 2001, SEDSIM in Hydrocarbon Exploration. In: Merriam, D., Davis, J. C. (Eds). Geologic Modeling and Simulation. Kluwer Academic, New York.

Hasler, C. A., E. W. Adams, R. A. Wood, and T. Dickson, 2008, Fine-scale forward modeling of a Devonian patch reef, Canning Basin, Western Australia, in P. de Boer, G. Postma, K. Van der Zwan, P. Burgess, and P. Kukla, eds., Analogue and numerical modelling of sedimentary systems: from understanding to prediction, v. 40, International Association of Sedimentology, p. 37-40.

Hutton, E. W. H., and J. P. Syvitsky, 2008, Sedflux 2.0: An advanced process-response model that generates three-dimensional stratigraphy: Computers & Geosciences, v. 34.

Imhof, M., and A. K. Sharma, 2006, Quantitative seismostratigraphic inversion of a prograding delta from seismic data: Marine and Petroleum Geolgy, v. 23, p. 735-744.

Imhof, M. G., Sharma, A. K. (2007). Seismostratigraphic inversion: Appraisal, ambiguity, and uncertainty. Geophysics, 72-4, R51-R66

Joseph P., and Granjeon, D., 1998, Method for simulating the filling of a sedimentary basin. U.S. Pat. No. 5,844,799

Kubo, Y., J. P. Syvitsky, E. W. H. Hutton, and C. Paola, 2005, Advance and application of the stratigraphic simulation model 2D-SedFlux: From tank experiment to geological scale simulation: Sedimentary Geology, v. 178, p. 187-195.

Lawrence, D. T., M. Doyle, and T. Aigner, 1990, Stratigraphic simulation of sedimentary basins—concepts and calibrations: AAPG Bull, v. 74, p. 273-295.

Lessenger, M., and T. A. Cross, 1996, An Inverse Stratigraphic Simulation Model—Is Stratigraphic Inversion Possible?: Energy Exploration Exploitation, v. 14, p. 627-637.

Paola, C., 2000, Quantitative models of sedimentary basin filling: Sedimentology, v. 47, p. 121-178.

Prather, B. E., 2000, Calibration and visualization of depositional process models for above-grade slopes: a case study from the Gulf of Mexico: Marine and Petroleum Geology, v. 17, p. 619-638.

Sambridge, M., 1999a, Geophysical inversion with a neighborhood algorithm—Searching a parameters space: Geophysical Journal International, v. 138, p. 479-494.

Sambridge, M., 1999b, Geophysical inversion with a neighborhood algorithm-II. Appraising the ensemble: Geophysical Journal International, v. 138, p. 727-746.

Sambridge, M., and K. Mosegaard, 2002, Monte Carlo methods in geophysical inverse problems: Reviews of Geophysics, v. 40.

Sharma, A. K., 2006, Quantitative stratigraphic inversion, Blacksburg, 91 p.

Sharma, A. K., and M. Imhof, 2007, Quantitative stratigraphic inversion: Case Study using Jurassic Tank Data: SEG Annual meeting.

Shuster, M. W., and T. Aigner, 1994, Two-Dimensional Synthetic Seismic and Log Cross Sections from Stratigraphic Forward Models: AAPG Bulletin, v. 78, p. 409-431.

Syvitski, J. P. M., Hutton, E. W. H., 2001. 2D SEDFLUX 1.0C: an advanced process-response numerical model for the fill of marine sedimentary basins. Computers & Geosciences 27 (6), p. 731-754.

Teles, V., R. Eschard, G. Etienne, S. Lopez, and A. Arnaud-Vanneau, 2008, Carbonate production and stratigraphic architecture of shelf-margin wedges (Cretaceous, Vercors): lessons from a stratigraphic modelling approach: Petroleum Geoscience, v. 14, p. 263-271.

Warrlich, G., D. Bosence, D. Waltham, C. Wood, A. Boylan, and B. Badenas, 2008, 3D stratigraphic forward modelling for analysis and prediction of carbonate platform stratigraphies in exploration and production: Marine and Petroleum Geolgy, v. 25, p. 35-38.

Watney, W., E. Rankey, and J. W. Harbaugh, 1999, Perspectives on stratigraphic simulation models, in J. W. Harbaugh, W. L. Watney, E. C. Rankey, R. Slingerland, R. H. Goldstein, and E. K. Franseen, eds., Numerical Experiments in Stratigraphy: Recent Advances in Stratigraphic and Sedimentologic Computer Simulation, v. 62: Tulsa, SEPM Special Publications, p. 3-20.

Wendebourg, J., and J. W. Harbaugh, 1996, Sedimentary process simulation: a new approach for describing petrophysical properties in three dimensions for subsurface flow simulations, in A. Förster, and D. F. Merriam, eds., Geologic Modeling and Mapping. Williams, H. D., P. M. Burgess, P. Wright, G. Della Porta, and D. Granjeon, 2011, Investigating carbonate platform types: multiple controls and a continuum of geometries: Journal of Sedimentary Research, v. 81.

Wijns, C., T. Poulet, F. Boschetti, C. Dyt, and C. M. Griffiths, 2004, Interactive inverse methodology applied to stratigraphic forward modelling, in A. Curtis, and R. Wood, eds., Geological Prior Information: Informing Science and Engineering, v. 239: London, Geological Society Special Publications, p. 147-156.

The invention claimed is:

1. A method for obtaining multiple calibrated stratigraphic forward models of a geological evolution and fill of a sedimentary basin for basin modeling or reservoir prediction for hydrocarbon exploration, the method comprising the steps of:
   a) obtaining geological data for the sedimentary basin;
   b) analyzing the geological data for determining a set of geological processes that are indicative of the geologic evolution and fill of the sedimentary basin;
   c) analyzing the geologic data for identifying a plurality of input parameters consistent with the set of geological processes, identifying the input parameters that are uncertain, and estimating a range of geologically realistic values for the uncertain input parameters;
   d) providing a process-based Stratigraphic Forward Modeling (SFM) tool capable of simulating the set of geological processes;
   e) defining calibration constraints from the geological data, and a calibration error threshold for each of the calibration constraints;
   f) providing a set of input parameters to the SFM tool;
   g) producing a set of stratigraphic forward models from the set of input parameters;
   h) determining a calibration error for each of the set of stratigraphic forward models by comparing to the calibration constraints;
   i) providing a conditional sampling algorithm, wherein the conditional sampling algorithm samples a neighborhood of the sets of input parameters that produced stratigraphic forward models with best agreement to the calibration constraints;
   j) providing a local minima explicit escape clause for the conditional sampling algorithm to forbid oversampling of local minima, wherein the local minima explicit escape clause identifies local minima, wherein the local minima are combinations of input parameters in a densely sampled region with a calibration error greater than the calibration error threshold, thereby allowing the conditional sampling algorithm to continue sampling in other regions of probable admissible solutions of input parameters;
   k) providing an admissible solution explicit escape clause for the conditional sampling algorithm to prevent oversampling of admissible solutions, wherein the admissible solution explicit escape clause identifies admissible solutions, wherein admissible solution are combinations of input parameters with a calibration error less than the calibration error threshold, thereby allowing the conditional sampling algorithm to continue sampling in other regions of probable admissible solutions of input parameters; and
   i) repeating steps g)-k), wherein the sets of input parameters is modified by the local minima explicit escape clause and the admissible solution explicit escape clause, until a plurality of admissible solutions are obtained, hereby providing multiple calibrated stratigraphic forward models of the geological evolution and fill of the sedimentary basin that can be used for basin modeling or reservoir prediction for hydrocarbon exploration.

2. The method of claim 1, wherein the Stratigraphic Forward Modeling tool is selected from a Two-Dimensional SFM Tool and a Three-Dimensional SFM tool.

3. The method of claim 1, wherein the calibration error in step h) is measured by a quantitatively defined error function that combines individual errors.

4. The method of claim 1, wherein the geological data is selected from the group consisting of:
   thicknesses measured at well locations,
   thicknesses measured from two-dimensional seismic data,
   thicknesses measured from three-dimensional seismic data,
   thicknesses measured from a gravity remote sensing application,
   thicknesses measured from an electromagnetic remote sensing application,
   thicknesses measured at outcrop exposures,
   proportions of a specific rock type measured at a well location,
   proportions of a specific rock type derived from a seismic attribute,
   proportions of a specific sediment class measured from an outcrop exposure, and
   combinations thereof.

5. The method of claim 1, wherein the conditional sampling algorithm is a randomized search algorithm.

6. The method of claim 5, wherein the randomized search algorithm is a swarm algorithm, an evolutionary algorithm, or a neighborhood search algorithm.

7. The method of claim 5, wherein the neighborhood is defined by the generalized hypervolume.

8. The method of claim 7, wherein the generalized hypervolume is defined by a polytope, a hypersphere, a hyperellipse or a Voronoi cell.

9. The method of claim 7, wherein the neighborhood provided by the generalized hypervolume contains in its interior a seed model used for the conditional sampling algorithm.

10. The method of claim 8, wherein the size of the generalized hypervolume surrounding the seed model is determined from an average distance of the Nm nearest neighbor models, wherein Nm is a parameter selected by the user.

11. The method of claim 1, wherein steps g)-k) are repeated until a stopping criterion is met, the stopping criterion selected from the group consisting of obtaining a predefined number of admissible solutions, reaching a predefined maximum number of iterations, reaching a predefined number of iterations without obtaining a new admissible solution, and combinations thereof.

12. The method of claim 1, further comprising the step of analyzing a plurality of admissible solutions by a probabilistic cluster analysis, thereby reducing and synthesizing the number of admissible solutions to a manageable number of distinct classes or scenarios of stratigraphic forward models with comparable input parameters.

13. The method of claim 1, wherein admissible solutions are used to generate predictions on thickness and composition of sedimentary units far away from the calibration constraint.

14. The method of claim 1, wherein the method is applied sequentially to individual stratigraphic models, wherein admissible solutions obtained from an older stratigraphic forward model are used as starting points for newer stratigraphic forward models, and in which the input process parameters relating to the older stratigraphic forward model are substantially unmodified or held constant in the newer stratigraphic forward model.

15. The method of claim 2, wherein the Stratigraphic Forward Modeling tool simulates transport and sedimentation from older to younger sediments using a process-based algorithm at a scale that encompasses at least part of a geological basin during a prolonged period of time ranging from thousands of years to tens of millions of years.

16. The method of claim 3, wherein the quantitatively defined error function is a summation or multiplication of the absolute value of the individual errors.

17. The method of claim 3, wherein each individual calibration error represents a specific calibration constraint.

18. The method of claim 3, wherein each individual calibration error can be defined as a calibration error selected from a specific location, a specific time interval, an average value for the entire model, and combinations thereof.

19. The method of claim 3, wherein each individual calibration error is associated to a user-specified error threshold.

20. The method of claim 19, wherein each individual calibration error is normalized by their respective error threshold before combination, and wherein if an individual calibration error is below its error threshold it does not contribute to the overall error.

* * * * *